(12) United States Patent
Schwarz et al.

(10) Patent No.: US 11,149,643 B2
(45) Date of Patent: Oct. 19, 2021

(54) HEAT EXCHANGER MOUNTED AT REAR OF GAS TURBINE ENGINE FOR CHALLENGING TEMPERATURE APPLICATIONS

(71) Applicant: UNITED TECHNOLOGIES CORPORATION, Farmington, CT (US)

(72) Inventors: Frederick M. Schwarz, Glastonbury, CT (US); Nathan Snape, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1085 days.

(21) Appl. No.: 15/369,189

(22) Filed: Dec. 5, 2016

(65) Prior Publication Data

US 2018/0156122 A1     Jun. 7, 2018

(51) Int. Cl.
*F02C 7/18*     (2006.01)
*F02K 3/06*     (2006.01)
(Continued)

(52) U.S. Cl.
CPC ............... *F02C 7/185* (2013.01); *F02C 3/04* (2013.01); *F02C 7/141* (2013.01); *F02C 9/18* (2013.01);
(Continued)

(58) Field of Classification Search
CPC .............................................. F05D 2260/213
See application file for complete search history.

(56) References Cited

U.S. PATENT DOCUMENTS 3,584,458 A * 6/1971 Wetzler ............... F01D 17/162
                                                    415/115
5,269,133 A * 12/1993 Wallace ................. F02C 7/185
                                                    165/142
(Continued)

FOREIGN PATENT DOCUMENTS

EP          3190271 A1     7/2017
EP          3115588 A1     11/2017
(Continued)

OTHER PUBLICATIONS

Special Metals: Inconel® alloy 625, Special Metals Corporation, Aug. 2013 http://www.specialmetals.com/assets/smc/documents/alloys/inconel/inconel-alloy-625.pdf, retrieved on Apr. 9, 2018.
(Continued)

*Primary Examiner* — Scott J Walthour
*Assistant Examiner* — Todd N Jordan
(74) *Attorney, Agent, or Firm* — Carlson, Gaskey & Olds, P.C.

(57) ABSTRACT

A gas turbine engine has a fan rotor delivering air into a bypass duct defined between an outer fan case and an outer interior housing. The fan rotor also delivers air into a compressor section, a combustor, a turbine section. A chamber is defined between the outer interior housing and an inner housing. The inner housing contains the compressor section, the combustor and the turbine section. A first conduit taps hot compressed air to be cooled and passes the air to at least one heat exchanger. The air is cooled in the heat exchanger and returned to a return conduit. The return conduit passes the cooled air to at least one of the turbine section and the compressor section. The heat exchanger has a core exhaust plane. The turbine section has at least a first and a downstream second rotor blade row, with the core
(Continued)

exhaust plane located downstream of a center plane of the second blade row.

17 Claims, 3 Drawing Sheets

(51) Int. Cl.
    *F02C 3/04*        (2006.01)
    *F02C 7/141*      (2006.01)
    *F02K 3/115*      (2006.01)
    *F02C 9/18*        (2006.01)

(52) U.S. Cl.
    CPC ............... *F02K 3/06* (2013.01); *F02K 3/115* (2013.01); *F05D 2260/213* (2013.01); *F05D 2260/232* (2013.01); *F05D 2270/01* (2013.01); *Y02T 50/60* (2013.01)

(56) References Cited

U.S. PATENT DOCUMENTS

| | | | |
|---|---|---|---|
| 5,413,752 A * | 5/1995 | Kissinger | B22F 3/24 148/514 |
| 6,202,403 B1 * | 3/2001 | Laborie | B64D 33/08 60/39.83 |
| 8,127,829 B2 | 3/2012 | Sabatino et al. | |
| 8,776,869 B2 | 7/2014 | Barnes et al. | |
| 9,243,850 B1 | 1/2016 | Bastian et al. | |
| 2007/0245739 A1 * | 10/2007 | Stretton | F01D 17/105 60/728 |
| 2009/0007567 A1 * | 1/2009 | Porte | F02C 7/141 60/785 |
| 2009/0226297 A1 * | 9/2009 | Yanagi | B64C 7/02 415/58.5 |
| 2011/0088405 A1 * | 4/2011 | Turco | F01D 5/081 60/782 |
| 2012/0216545 A1 * | 8/2012 | Sennoun | B64D 13/06 60/772 |
| 2013/0186102 A1 * | 7/2013 | Lo | F02C 7/18 60/785 |
| 2014/0319269 A1 * | 10/2014 | Scarr | F04D 29/40 244/54 |
| 2018/0003076 A1 * | 1/2018 | Miller | F01D 25/12 |

FOREIGN PATENT DOCUMENTS

| | | | | |
|---|---|---|---|---|
| EP | | 3239493 A1 | 11/2017 | |
| WO | WO 2015030948 A1 * | | 3/2015 | ............. F01D 9/065 |

OTHER PUBLICATIONS

European Search Report for EP Application No. 17205089.0 dated Apr. 24, 2018.

* cited by examiner

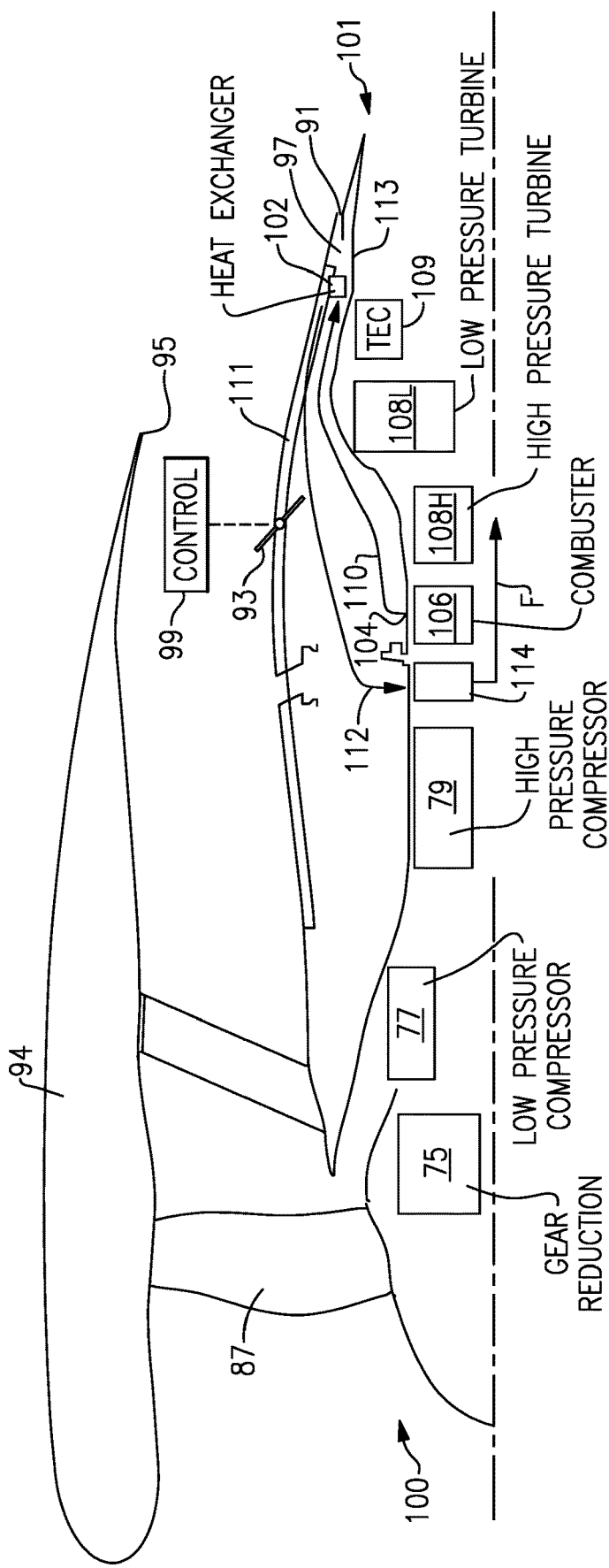

HEAT EXCHANGER MOUNTED AT REAR OF GAS TURBINE ENGINE FOR CHALLENGING TEMPERATURE APPLICATIONS

BACKGROUND OF THE INVENTION

This application relates to a heat exchanger for providing cooling air in a gas turbine engine.

Gas turbine engines are known and typically include a fan delivering air into a bypass duct as propulsion air, and further providing air into a core housing. Air in the core housing passes into a compressor where it is compressed, and then into a combustor where it is mixed with fuel and ignited. Products of this combustion pass downstream over turbine rotors, driving them to rotate.

As is known, turbine components see very high temperatures and thus cooling air has been typically provided to those components. Historically, the fan and a low pressure compressor have rotated as a single unit along with a fan drive turbine. However, more recently, a gear reduction has been placed between the fan rotor and the fan drive turbine. This allows the fan rotor to rotate at slower speeds and the fan drive turbine to rotate at faster speeds. This raises the challenges on the turbine components and requires more efficient provision of the cooling air.

At the same time, the overall pressure ratio provided by the compressor has increased. Historically, the air to cool the turbine components has been tapped from a location downstream of a highest pressure location on the compressor. However, with the increase in overall pressure ratio, this air has become hotter.

The heat exchangers for cooling this air are thus subject to extreme challenges.

SUMMARY OF THE INVENTION

In a featured embodiment, a gas turbine engine has a fan rotor delivering air into a bypass duct defined between an outer fan case and an outer interior housing. The fan rotor also delivers air into a compressor section, a combustor, a turbine section. A chamber is defined between the outer interior housing and an inner housing. The inner housing contains the compressor section, the combustor and the turbine section. A first conduit taps hot compressed air to be cooled and passes the air to at least one heat exchanger. The air is cooled in the heat exchanger and returned to a return conduit. The return conduit passes the cooled air to at least one of the turbine section and the compressor section. The heat exchanger has a core exhaust plane. The turbine section has at least a first and a downstream second rotor blade row, with the core exhaust plane located downstream of a center plane of the second blade row.

In another embodiment according to the previous embodiment, the turbine section includes a fan drive turbine which drives the fan rotor through a gear reduction.

In another embodiment according to any of the previous embodiments, the turbine section includes at least a high pressure turbine and a low pressure turbine, and the heat exchanger core exhaust plane is positioned downstream of an axially downstream most end of the high pressure turbine.

In another embodiment according to any of the previous embodiments, the heat exchanger core exhaust plane is positioned downstream of an axially downstream most end of the low pressure turbine.

In another embodiment according to any of the previous embodiments, a turbine exhaust case is positioned downstream of the low pressure turbine and the heat exchanger core exhaust plane is positioned downstream of an axially downstream most end of the turbine exhaust case.

In another embodiment according to any of the previous embodiments, the outer interior housing includes a pivoting cowl door.

In another embodiment according to any of the previous embodiments, the first conduit and the return conduit stay fixed to the engine when the outer cowl door is pivoted open.

In another embodiment according to any of the previous embodiments, there is a shut off valve on the first conduit for controlling the flow of hot compressed air to the heat exchanger.

In another embodiment according to any of the previous embodiments, a flow valve selectively allows air to flow into the chamber and over the heat exchanger.

In another embodiment according to any of the previous embodiments, a control for the shut off valve limits the flow of hot compressed air to the heat exchanger under low power conditions and allows the flow of air to the heat exchanger under higher power conditions.

In another embodiment according to any of the previous embodiments, the lower power conditions include at least idle and cruise conditions.

In another embodiment according to any of the previous embodiments, the higher pressure conditions include at least take-off.

In another embodiment according to any of the previous embodiments, a control for the shut off valve limits the flow of hot compressed air to the heat exchanger under low power conditions and allows the flow of air to the heat exchanger under higher power conditions.

In another embodiment according to any of the previous embodiments, the lower power conditions include at least idle and cruise conditions.

In another embodiment according to any of the previous embodiments, a flow valve is mounted on the outer interior housing, and selectively allows air to flow into the chamber and over the heat exchanger.

In another embodiment according to any of the previous embodiments, the heat exchanger is formed of elongated members having fins on an outer surface.

In another embodiment according to any of the previous embodiments, the elongated members are tubes.

In another embodiment according to any of the previous embodiments, the elongated members extend radially outwardly to an elbow which takes air radially outwardly to the elbow and a second elongated member returns air radially inwardly into a housing for the engine.

In another embodiment according to any of the previous embodiments, the elongated members are formed of a cast nickel alloy.

In another embodiment according to any of the previous embodiments, the return conduit passing into a strut and radially inwardly to pass to the turbine section.

These and other features may be best understood from the following drawings and specification.

BRIEF DESCRIPTION OF THE DRAWINGS

FIG. 2A schematically shows the provision of a turbine cooling system.

FIG. 2B schematically shows the position of a heat exchanger.

FIG. 2C shows a control feature.

DETAILED DESCRIPTION

Figure 1:
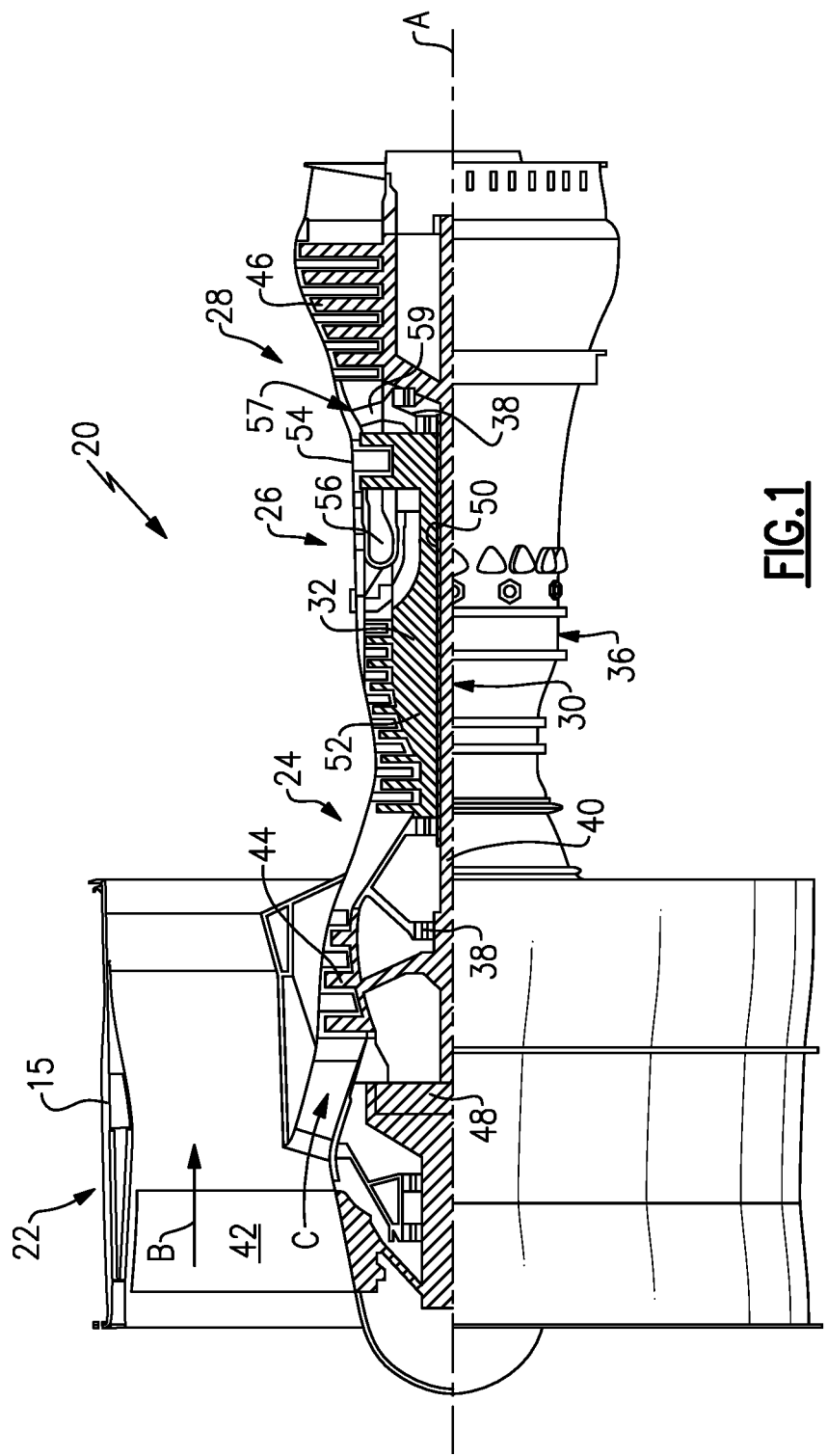
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

FIG. 2A shows an engine 100 with turbine cooling system 101. Heat exchanger 102 is placed at an aft position in a chamber 97 defined between an outer cowl door 111, which is part of an outer interior housing and an inner housing 113. Air from a location 104, which is downstream of a high pressure compressor 79, is tapped. The air is shown tapped outwardly of a combustor 106, however, other locations may be utilized. The air is cooled and then provided to the turbine section 108 for cooling components in the turbine section 108. As known, the turbine section includes a high pressure turbine 108H and a low pressure turbine 108L. The low pressure turbine may drive a fan rotor 87 through a gear reduction 75 and a low pressure compressor 77 as explained above. Housing 113 surrounds the compressor, combustor and turbine.

The tapped air is tapped through conduit 110 to the heat exchanger 102. As shown, the heat exchanger 102 is positioned downstream of the turbine section. Conduit 112 returns the air back into the housing and through a hollow strut 114, where it passes radially inwardly and then to the turbine section 108 at 109, as shown at F.

As shown, a valve 93 in the cowl door 111 may be selectively opened to allow bypass air to pass into chamber 97 and across the heat exchanger 102. The air then exits through a nozzle 91 defined between inner housing 113 and cowl door 111 and adjacent a downstream most end of the inner housing.

The bypass air downstream of the heat exchanger 102 having cooled the extremely hot air in the heat exchanger 102 would itself become hot. Thus, positioning the heat exchanger 102 at an aft position limits the length over which the cowl door is exposed to this extremely hot bypass air. In embodiments, the heat exchanger 102 is positioned axially downstream of a downstream end 95 of an outer fan case housing 94 which surrounds fan rotor 87. In other embodiments, the heat exchanger 102 is positioned to be downstream of a downstream most end of high pressure turbine 108H and in another embodiment to be downstream of low pressure turbine 108L. In the illustrated embodiment, the heat exchanger 102 is downstream of the downstream most end of a turbine exhaust case 109. As arranged, the position of the heat exchanger thus limits the exposure of the cowl door 111 and other potentially exposed components compared to an engine with a heat exchanger positioned at a more upstream location.

A control 99 controls the valve 93.

In one sense, FIG. 2B schematically shows the location of a heat exchanger 84 in connection with embodiments of this disclosure. Heat exchanger 84 has a core exhaust plane 86. Turbine blade rows 80 and 82 are shown. Blade row 80 is the most upstream blade row in the high pressure turbine 108. Blade row 82 may be the first turbine blade row in the low pressure turbine section 108L, or it could be a second stage turbine blade row in the high pressure turbine 108H if high pressure turbine 108H has at least two blade rows. The blade row 82 has a center plane 88. The plane 86 is downstream of the center plane 88. As described more fully with regard to FIG. 2A, the heat exchanger 102 may be even further downstream, however, FIG. 2B shows the location of a heat exchanger in one embodiment.

FIG. 2C shows the operation and control of a valve 105 on the line 110. Line 110 connects the hot tapped air from tap 104 to the heat exchanger 102 and to the downstream conduit 112, leading to the strut 114 for reintroducing the air as cooling air. The control 99 may control the valve 105 in combination with the valve 93. As an example, the airflow to the heat exchanger from conduit 110 may be allowed under high temperature operation such as take-off. On the other hand, the valve 105 may be moved to the position illustrated schematically in FIG. 2C where it simply routes the tapped air into conduit 112 without passing through the heat exchanger 102. This position may be utilized at idle and cruise as examples. Under such conditions, the valve 93 may be closed to provide better aerodynamic operation.

By keeping the flow to the heat exchanger 102 off at idle, the discs in the compressor and turbine section are kept at a higher temperature, thus reducing the temperature gradients the discs will see at take-off and the rapid increase in acceleration.

Preferably there are a plurality of circumferentially spaced conduits 110, 112 and struts 114. In the illustrated embodiment, the conduits 110 and 112 are fixed with the engine and separate from the moveable cowl door 111. On the other hand, there could be a kiss seal or similar connection between the heat exchanger 102 and the cowl door.

While the engine is shown utilizing bypass air to cool the heat exchanger, air tapped from an upstream location in the compressor can also be utilized.

The control 99 may be provided with instrumentation to detect a failure of the valves 105 and 93.

Figure 3A:
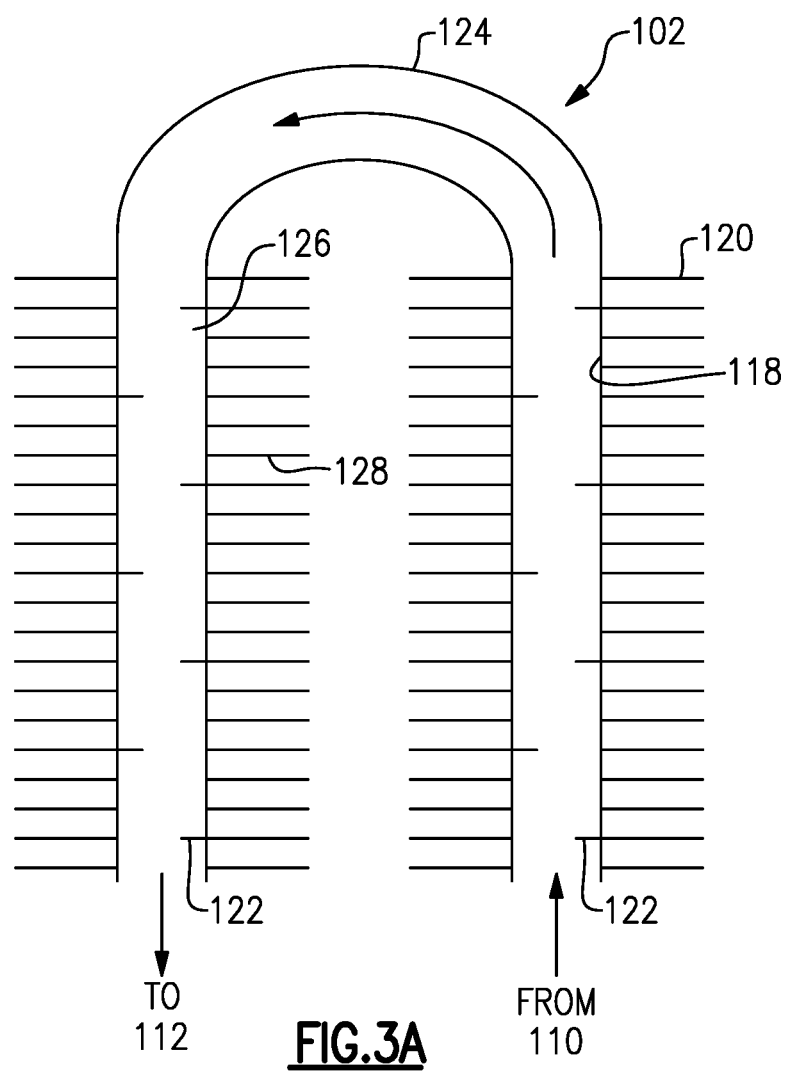
FIG. 3A shows a first embodiment heat exchanger.

FIG. 3A shows an embodiment of the heat exchanger 102. Air from conduit 110 passes into a tube 118. The tube 118 is provided with fins 120. Further, trip strips or other turbulence causing structures 122 may be formed on an inner wall of the tube 118. The tube 118 is preferably relatively short, as radially outer locations will provide less efficient cooling than radially inner locations.

The air reaches an elbow 124 and then returns inwardly through another tube 126 which may be provided with fins 128 and also trip strips, if desired. That air returns to the conduit 112.

Figure 3B:
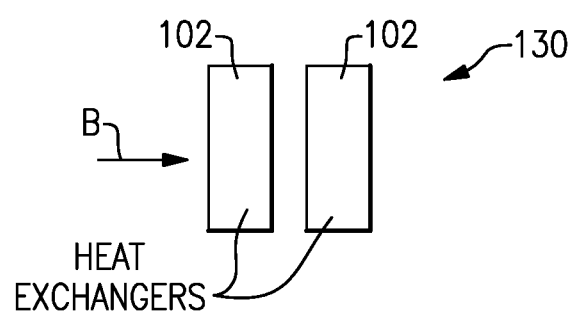
FIG. 3B shows an alternative embodiment.

As shown in FIG. 3B, there may be axially spaced heat exchangers 102, spaced serially into the engine in an embodiment 130.

In embodiments, the heat exchanger tubes 118 and 126, and optionally the fins 120 and 128 and trip strips 122 may be formed of a super alloyed material typically utilized for turbine components. In particular, a cast nickel alloy material including more than 50-percent by volume gamma-prime (Y'). Intermetallic phase material may be utilized as the Y' material. The intermetallic phase material may be $Ni_3AL$ or $Ni_3TI$ as examples.

The use of this alloy, which has been typically reserved for use in the turbine, allows the heat exchanger to survive much higher temperatures than with typical heat exchangers utilized in gas turbine engines. As such, the challenges mentioned above can be addressed.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a fan rotor delivering air into a bypass duct defined between an outer fan case and an outer interior housing, said fan rotor also delivering air into a compressor section, a combustor, a turbine section;
   a chamber defined between said outer interior housing and an inner housing;
   said inner housing containing said compressor section, said combustor and said turbine section;
   a first conduit for tapping hot compressed air to be cooled and passing said air to at least one heat exchanger, said air being cooled in said heat exchanger and returned to a return conduit, said return conduit passing the cooled air to at least one of said turbine section and said compressor section;
   said heat exchanger having a core exhaust plane, and said turbine section having at least a first and a downstream second rotor blade row, with said core exhaust plane located downstream of a center plane of said second blade row;
   wherein said turbine section includes at least a high pressure turbine and a low pressure turbine, and said heat exchanger core exhaust plane is positioned downstream of an axially downstream most end of said high pressure turbine; and
   wherein said heat exchanger core exhaust plane is positioned downstream of an axially downstream most end of said low pressure turbine.

2. The gas turbine engine as set forth in claim 1, wherein a turbine exhaust case is positioned downstream of said low pressure turbine and said heat exchanger core exhaust plane is positioned downstream of an axially downstream most end of said turbine exhaust case.

3. The gas turbine engine as set forth in claim 1, wherein said outer interior housing includes a pivoting cowl door.

4. The gas turbine engine as set forth in claim 3, wherein said first conduit and said return conduit stay fixed to the engine when said outer cowl door is pivoted open.

5. The gas turbine engine as set forth in claim 1, wherein there is a shut-off valve on said first conduit for controlling the flow of hot compressed air to said heat exchanger.

6. The gas turbine engine as set forth in claim 5, wherein a flow valve selectively allows air to flow from said bypass duct into said chamber and over said heat exchanger.

7. The gas turbine engine as set forth in claim 6, wherein a control for said shut off valve limits the flow of hot compressed air to said heat exchanger under low power conditions and allows the flow of air to said heat exchanger under higher power conditions.

8. The gas turbine engine as set forth in claim 7, wherein said low power conditions include at least idle and cruise conditions.

9. The gas turbine engine as set forth in claim 8, wherein said higher power conditions include at least take-off.

10. The gas turbine engine as set forth in claim 5, wherein a control for said shut-off valve limits the flow of hot compressed air to said heat exchanger under low power conditions and allows the flow of air to said heat exchanger under higher power conditions.

11. The gas turbine engine as set forth in claim 10, wherein said low power conditions include at least idle and cruise conditions.

12. The gas turbine engine as set forth in claim 1, wherein a flow valve is mounted on said outer interior housing, and selectively allows air to flow from said bypass duct into said chamber and over said heat exchanger.

13. The gas turbine engine as set forth in claim 1, wherein said heat exchanger is formed of elongated members having fins on an outer surface.

14. The gas turbine engine as set forth in claim 13, wherein said elongated members are tubes.

15. The gas turbine engine as set forth in claim 13, wherein said elongated members include a first elongated member that extends radially outwardly to an elbow, and a second elongated member that returns air radially inwardly from said elbow into a housing for said engine.

16. The gas turbine engine as set forth in claim 15, wherein said elongated members are formed of a cast nickel alloy.

17. The gas turbine engine as set forth in claim 1, wherein said return conduit passes into a strut and radially inwardly to pass to the turbine section.

* * * * *